(12) United States Patent
Bahattab et al.

(10) Patent No.: US 8,124,680 B2
(45) Date of Patent: Feb. 28, 2012

(54) COATING COMPOSITIONS COMPRISING A POLYURETHANE POLYOL COMPOSITION AND NANOPARTICLES, AND PROCESS FOR PREPARING THE SAME

(75) Inventors: Mohammed Abdullah Bahattab, Riyadh (SA); Ahmed Ali Basfar, Riyadh (SA); Khondoker Muhammad Idris, Riyadh (SA); Mohammad Asif Alam, Riyadh (SA)

(73) Assignee: King Abdulaziz City Science and Technology, Riyadh (SA)

( * ) Notice: Subject to any disclaimer, the term of this patent is extended or adjusted under 35 U.S.C. 154(b) by 54 days.

(21) Appl. No.: 12/728,166

(22) Filed: Mar. 19, 2010

(65) Prior Publication Data
US 2010/0249274 A1 Sep. 30, 2010

(30) Foreign Application Priority Data

Mar. 24, 2009 (EP) .................................. 09004204

(51) Int. Cl.
*C08K 3/34* (2006.01)
(52) U.S. Cl. ......... 524/430; 523/332; 524/492; 524/493
(58) Field of Classification Search .................. 523/322; 524/492, 493, 430
See application file for complete search history.

(56) References Cited

U.S. PATENT DOCUMENTS
2004/0096663 A1 * 5/2004 Yamaguchi et al. .......... 428/403
* cited by examiner

*Primary Examiner* — Edward Cain
(74) *Attorney, Agent, or Firm* — Raj Abhyanker, P.C.

(57) ABSTRACT

The invention relates to a coating composition comprising a polyurethane polyol composition comprising the reaction product of a polyisocyanate and a polyol, and modified nanoparticles of silica and/or alumina, and to a process for preparing such coating composition.

19 Claims, No Drawings

COATING COMPOSITIONS COMPRISING A POLYURETHANE POLYOL COMPOSITION AND NANOPARTICLES, AND PROCESS FOR PREPARING THE SAME

CLAIM OF PRIORITY

This application claims priority to the foreign filed application No. EP09004204.5 tilted "Coating Compositions Comprising A Polyurethane Polyol Composition And Nano Particles, And Process For Preparing The Same", filed on 24 Mar. 2009. The co-pending application and the present application are owned by one and the same assignee, namely, KACST.

The description set forth in the co-pending application is hereby incorporated into the present application by this reference.

FIELD OF INVENTION

This present invention relates to coating compositions comprising a polyurethane polyol composition and nanoparticles. The present invention relates to provide make a coating composition to produce a finished coating that has improved properties, in particular improved hardness and abrasion resistance.

BACKGROUND

Polyurethane polyol compositions comprising the reaction product of a polyisocyanate, a polyol and a monofunctional alcohol or thiol are generally known, e.g. from International Patent Publication WO 96/40813. This reference discloses, in general terms, that the monofunctional alcohol or thiol can be linear or branched, cyclic or acyclic, and that the alcohol or thiol can be primary, secondary or tertiary.

Polyurethane polyol compositions comprising the reaction product of a polyisocyanate, a polyol and a Guerbet alcohol, are also generally known, e.g., from International Patent Publication WO 02/051901. The reference discloses, in general terms, the use of a Guerbet alcohol having at least 12 carbon atoms.

It is also generally known to use polyurethane polyol compositions as part of coating compositions and in multi-component coating systems. Such compositions and systems may also comprise further auxiliary agents, such as levelling agents, drying agents, dispersion agents or surface modifiers.

There is a need to find a composition that has improved abrasive resistance and increased hardness.

SUMMARY

In the present invention one of the embodiments is a coating composition comprising of a polyurethane polyol composition with the reaction product of a polyisocyanate and a polyol, and optionally modified nanoparticles of silica and/or alumina.

Preferably, the particle size of the nanoparticles (b) is within a range from 10 to 500 nm, most preferably from 20 to 200 nm.

The preferred polyols used in the coating composition of the present invention are selected from the group consisting of $\alpha,\beta$- and $\alpha,\gamma$-diols, and mixtures thereof.

The preferred polyisocyanates used for the coating composition according to the present invention are selected from the group consisting of 1,6-hexamethylene diisocyanate, aliphatic polyisocyanate, isophorone diisocyanate, tetramethylxylene diisocyanate, 2-methyl-1,5-pentane diisocyanate, 2,2,4-trimethyl-1,6-hexamethylene diisocyanate, 1,12-dodecane diisocyanate, methylene bis(4-cyclohexylisocyanate), the biuret of 1,6-hexamethylene diisocyanate, the isocyanurate of 1,6-hexamethylene diisocyanate, the isocyanurate of isophorone diisocyanate, and the triisocyanate functional adduct of tetramethylxylene diisocyanate and trimethyl propane.

Preferably, the coating composition of the present invention additionally comprises at least one dispersing agent and/or at least one surface modifier, wherein the surface modifier is preferably selected from the group consisting of methacryloxy-propyl-trimethoxy-silane (MEMO), vinyl-trimethoxy-silane (VTMO), isobutyl-trimethoxy-silane (IBTMO) and 3-glycidoxy-propyl-trimethoxy-silane (GLYMO).

The invention is also related to a process for preparing a coating composition according to the present invention comprising the use of ultrasonic dispersion, wherein the ultrasonic dispersion is preferably accomplished by a continuous or pulse ultrasonic dispersion technique.

The inventors have found that coating compositions comprising a polyurethane polyol composition and nanoparticles of silica and/or alumina, optionally in a modified form, and preferably with a particle size in the range from 10 to 500 nm, preferably 20 to 200 nm, produce a finished coating that has surprisingly improved properties compared to conventional coating compositions comprising a polyurethane polyol composition. The finished coating, for example, shows a better hardness and abrasion resistance. Additionally, the uncured coating composition has lower volatile organic compounds (VOC) content and lower viscosity.

DETAILED DESCRIPTION

A polyurethane polyol is generally the reaction product of a polyisocyanate and a polyol.

Polyisocyanates useful in the present invention typically have a functionality of 2 to 5. Due to variations in the preparation of such polyisocyanates, commercially available compounds may contain a mixture of functionalities.

The functionality is a characteristic of oligo-polyol for polyurethane composition after the hydroxyl number and is defined as the number of hydroxyl groups/molecule of oligo-polyol. It can be determined by the determination of the conversion at the gel point of a reaction between a polyol and a diisocyanate, or it can be determined by using the well known equation of Flory $p=2/f$, where p is the conversion at gel point and f is the medium functionality of the reaction system. The current invention uses Polyisocyanates having a functionality of 2-5.

In another embodiment a commercially available Polyisocyanates are used that have mixed functionalities.

Non-limiting examples of polyisocyanates are 1,6-hexamethylene diisocyanate, aliphatic polyisocyanate, isophorone diisocyanate, tetramethylxylene diisocyanate, 2-methyl-1,5-pentane diisocyanate, 2,2,4-trimethyl-1,6-hexamethylene diisocyanate, 1,12-dodecane diisocyanate, methylene bis(4-cyclohexylisocyanate), the biuret of 1,6-hexamethylene diisocyanate, the isocyanurate of 1,6-hexamethylene diisocyanate, the isocyanurate of isophorone diisocyanate, and the triisocyanate functional adduct of tetramethylxylene diisocyanate and trimethylol propane. The preferred polyisocyanates are commercially available products such as the biuret or the isocyanurate of 1,6-hexamethylen diisocyanate (HDI) or aliphatic polyisocyanates for water-based systems, such as Bayhydur® 2336.

Non-limiting examples of polyols are α,β- and α,γ-diols, for example, 2-ethyl-1,3-hexane diol, 1,2-hexane diol, 1,2-octane diol, 1,2-decane diol, 2,2,4-trimethyl-1,3-pentane diol, and 2-butyl-2-ethyl-2,3-propane diol. The preferred polyols are hydroxyl functional pre-polymers such as hydroxy polyacrylate (Desmophen® A 160 or A 365) and hydroxy functional urethane acrylate (Bayhydrol® UV 2282).

Incorporation of nanoparticles of silica and/or alumina is an essential feature of the coating compositions of the present invention. Non-limiting examples of nanoparticles of silica and/or alumina have a particle size of from 10 to 500 nm, preferably from 20 to 200 nm, preferably a particle size of 20 nm, 50 nm, 100 nm or 200 nm.

Specific examples of nanoparticles of silica are commercially available under the tradenames DP5820 (20 nm), DP5480 (50 nm) or DP5840 (100 nm) from NYACOL Nano Technologies, Inc., Ashland, Mass., USA. One example of nanoparticles of alumina is, without limitation, BYK 3600 (40 nm) from BYK Chemie, Wesel, Germany.

The coating compositions of the present invention may also comprise one or more dispersing agents for helping dispersing the nanoparticles in the polyurethane polyol composition. Non-limiting examples of the dispersing agents useful in the present invention are Polyether modified dimethylpolysiloxane copolymer (BYK331) and solution of a copolymer with acidic groups in methoxypropylacetate/alkylbenzene (1/1) solvents BYK110 of BYK Chemie, Wesel, Germany.

The coating compositions according to the present invention may also contain one or more leveling agent to influence leveling of the coating as well as to create an anti-blistering effect in the coating. Non-limiting examples of leveling agents useful in the present invention are ethylene glycol and propylene glycol.

The coating compositions of the present invention may further comprise one or more drying agents to shorten the drying process. Non-limiting examples of drying agents useful in the present invention are methyl ethyl ketone, methyl isobutyl ketone and xylene.

The coating compositions of the present invention may also comprise one or more surface modifiers. Non-limiting examples of surface modifiers are silane agents such as methacryloxy-propyl-trimethoxy-silane (MEMO), vinyl-trimethoxy-silane (VTMO), isobutyl-trimethoxy-silane (IBTMO) and 3-glycidoxy-propyl-trimethoxy-silane (GLYMO). Such surface modifiers may be taken alone or in combination with each other. For example, MEMO may be taken individually or in combination with one or more of the other silane agents, i.e. IBTMO, GLYMO or VTMO, at equal or different proportions.

For preparing the coating compositions of the present invention, at first, a colloidal solution of the nanoparticles is prepared by mixing the one or more surface modifier into a methanol-HCl solution (Methanol: 0.01M HCl=2:1 w/w). Then, the nanoparticles, and optionally water, are admixed to result in a final mixture of nanoparticles, surface modifier, methanol-HCl and water, for example, in a ratio of 3:2:3:2 (w/w). This mixture is thoroughly mixed, for example, mechanically at 240 rpm. The entire solution is then refluxed in a round bottom flask for condensation. Water is circulated through the condenser at about 18° C. with the help of a thermo-stated water bath. Within about 45 minutes condensation is complete and white slurry is obtained. The excess water is removed from the slurry, and the water-free white mass is then used for preparing the final coating compositions which are prepared by mixing the colloidal nanoparticle solution with the polyol, preferably a pre-polymer, and further auxiliary agents, such as dispersing agents, leveling agents, drying agents, etc.

Preferably at this stage, ultrasonic dispersion might be used, for example, a continuous or pulse ultrasonic dispersion technique, to achieve better dispersion of the different components, in particular the nanoparticles in the bulk solution of the pre-polymers. For example, about 50 g of the mixture is taken in a beaker and is treated with ultrasonic vibration for up to 60 minutes using an Ultrasonic Generator (model VCX-750-20-kHz) of Sonics and Materials Co., Newton, Conn., USA, with a 13-mm solid probe standard titanium horn. The power of the oscillator ranges from 0-100% with acoustic energy corresponding to 5 to 20 W·cm2.

Preparation of formulations for 2-pack coatings was accomplished in combination with mechanical stirring and/or ultrasonic vibration depending on the necessity of dispersion of different components of the coating materials in the formulations.

After preparation of the mixture of the nanoparticles with the polyol pre-polymer, with or without ultrasonic treatment, polyisocyanate, i.e. the hardener, was incorporated into the mixture before coating the composition onto substrates.

The coating composition of the present invention can be applied to any substrate. The substrate may be, for example, metal, glass, plastic, wood, ceramic, or another coating layer. The other coating layer may be made of the coating composition of the present invention or may be a different coating composition. The coating compositions of the present invention can be applied by conventional means such as brush, roller or spray gun. Curing temperatures preferably are between 0 and 130° C. and more preferably between 20 and 120° C.

The coating compositions of the present invention show particular utility as prim coats, top coats and clear coats. The coating compositions are particularly suitable in the preparation of coated metal substrates, in particular transportation vehicles such as trains, trucks, buses, and airplanes.

EXAMPLES

Example 1

A 1-liter, flat surface metallic pot equipped with a mechanical stirrer operating up to 20000 rpm was used. The different components were polyol acrylate pre-polymer resin Desmophen® A160 (60 g), dispersing agent BYK 331 (0.3 g), ethylene glycol acetate (EGA, 6 g), methyl ethyl ketone (MEK, 7 g), xylene (12 g) and 20 g of nanosilica colloidal solution. After adding each of the above components one by one to the starting material Desmophen A 160, the solution was stirred each time mechanically at 400 rpm for 5 minutes. 20 g of hardener Desmodur® N 75 was added to a desired amount of the above mixture with mechanical stirring, similarly at 400 rpm for 5 minutes. The mixture was then ready to be coated onto different substrates after its viscosity had reached 40 s determined by the Ford cup method. Different substrates were coated using a bar coater #40. The coating was cured by UV radiation under 6 passes.

Example 2

A 1-liter, flat surface metallic pot equipped with a mechanical stirrer operating up to 20000 rpm was used. 120 g of Desmophen® A160 was taken in a metallic pot and stirred for 5 minutes at 3000 rpm. 1.6 g of dispersing agent BYK110 was added to the polyol and stirred similarly for 5 minutes, followed by 12 g of leveling agent EGA and stirred for 5 minutes and then 12 g of nanosilica colloidal solution was incorporated and stirred for 15 minutes. It was followed by adding 10 g of drying agent MEK and stirred for 5 minutes. Before coating the substrates, 36 g of the hardener N75 (Ex. 2a) or N3390 (Ex. 2b) was added to the above solution and stirred for 5 minutes. When the viscosity had reached 40 s determined by the Ford cup method, different substrates were coated using a bar coater #40.

Example 3

A 1-liter, flat surface metallic pot equipped with a mechanical stirrer operating up to 20000 rpm was used. 120 g of Desmophen® A365 was taken in a metallic pot and stirred for 5 minutes at 3000 rpm. 1.6 g of dispersing agent BYK110 was added to polyol and stirred similarly for 5 minutes, followed by 12 g of leveling agent EGA and stirred for 5 minutes and then 12 g of nanosilica colloidal solution was incorporated and stirred for 15 minutes. It was followed by adding 10 g of drying agent MEK and stirred for 5 minutes. Before coating the substrates, 40 g of the hardener N75 (Ex. 3a) or N3390 (Ex. 3b) was added to the above solution and stirred for 5 minutes. When the viscosity had reached 40 s determined by the Ford cup method, different substrates were coated using a bar coater #40.

Example 4

A 1-liter, flat surface metallic pot equipped with a mechanical stirrer operating up to 20000 rpm was used. 120 g of Desmophen® A160 was taken in a metallic pot and stirred for 5 minutes at 3000 rpm. 1.6 g of dispersing agent BYK110 was added to the polyol and stirred similarly for 5 minutes, followed by 12 g of leveling agent EGA and stirred for 5 minutes and then adding 10 g of drying agent MEK and stirred for 5 minutes. 12 g of nanosilica colloidal solution was mixed first with 1.6 g of the coupling silane agent 3-(trimethoxysilyl) propyl methacrylate (TMSPMA) at the ratio of 12:1.6 (wt./wt.) and the mixture of silane and nanoparticles of silica was stirred for 6 hours using a magnetic stirrer. The mixture of silane and nanoparticles of silica was then added to the formulations, stirred for 15 minutes at 3000 rpm and finally hardener N75 (Ex. 4a) or N3390 (Ex. 4b) was added to it and stirred again for 5 minutes. When the viscosity had reached 40 s determined by the Ford cup method, different substrates were coated using a bar coater #40.

Example 5

A 1-liter, flat surface metallic pot equipped with a mechanical stirrer operating up to 20000 rpm was used. 120 g of Desmophen® A365 was taken in a metallic pot and stirred for 5 minutes at 3000 rpm. 1.6 g of dispersing agent BYK110 was added to the polyol and stirred similarly for 5 minutes, followed by 12 g of leveling agent EGA and stirred for 5 minutes and then adding 10 g of drying agent MEK and stirred for 5 minutes. 12 g of nanosilica colloidal solution was mixed first with 1.6 g of the coupling agent 3-(trimethoxysilyl) propyl methacrylate (TMSPMA) at the ratio of 12:1.6 (wt./wt.) and the mixture of silane and nanoparticles of silica was stirred for 6 hours using a magnetic stirrer. The mixture of silane and nanoparticles of silica was then added to the formulation, stirred for 15 minutes at 3000 rpm and finally hardener N75 (Ex. 5a) or N3390 (Ex. 5b) was added to it and stirred again for 5 minutes and finally another 40 g of hardener N75 or N3390 was added to it and stirred again for 5 minutes. When the viscosity had reached 40 s determined by the Ford cup method, different substrates were coated using a bar coater #40.

Example 6

A 1-liter, flat surface metallic pot equipped with a mechanical stirrer operating up to 20000 rpm was used. 120 g of Desmophen® A365 was taken in a metallic pot and stirred for 5 minutes at 3000 rpm. 1.6 g of dispersing agent BYK331 was added to the polyol and stirred similarly for 5 minutes, followed by leveling agent 12 g of EGA and 10 g of xylene and then stirred for 5 minutes. 12 g of one or two of compatible solvents EAc, MPAc and BAc were added and then stirred for 5 minutes. 36 g of nanosilica colloidal solution which was modified with MEMO (3-(trimethoxysilyl)propyl methacrylate) and stirred for 15 minutes. Before coating the substrates, 40 g of the hardener N3390 was added to the above solution and stirred for 5 minutes. When the viscosity had reached 40 s determined by the Ford cup method, different substrates were coated using a bar coater #40.

Example 7

A 1-liter, flat surface metallic pot equipped with a mechanical stirrer operating up to 20000 rpm was used. 120 g of Desmophen® A365 was taken in a metallic pot and stirred for 5 minutes at 3000 rpm. 1.6 g of dispersing agent BYK331 was added to the polyol and stirred similarly for 5 minutes, followed by leveling agent 12 g of EGA and then stirred for 5 minutes. 30 g of nanosilica colloidal solution which was modified with MEMO (3-(trimethoxysilyl) propyl methacrylate) and IBTMO (isobutyl trimethoxysilane) and then stirred for 1 hr. Before coating the substrates, 40 g of the hardener N3390 was added to the above solution and stirred for 5 minutes. When the viscosity had reached 40 s determined by the Ford cup method, different substrates were coated using a bar coater #40.

Example 8

A 1-liter, flat surface metallic pot equipped with a mechanical stirrer operating up to 20000 rpm was used. 75 g of polyol pre-polymer UV 2282 was taken in a metallic pot and mechanically stirred at 3000 rpm for 5 minutes. 0.5 g of dispersing agent BYK 348 was added to it and stirred at the same speed for 5 minutes, followed by 15 g of water and stirred for 5 minutes, then 0.5 g of antifoam agent BYK 024 was added. 2 g of photo-initiator Irgacure 500 was added and stirred for 5 minutes, followed by 2 g of ethanol and stirred for 5 minutes and 5 g of nanoparticles of silica colloidal solution or 5 g of nanoalumina colloidal solution and stirred for 5 minutes. Finally 2 g of hardener Bayhydur® 2336 was added and stirred for 5 minutes. Generally, hardener was used just before coating and the pH of the solution was adjusted to 8 with triethylamine (TEA). The solution was coated as thin films with an abrader coater (#120) onto substrate. The coated substrate was allowed to stand for about 20 minutes in order to let water molecules evaporate out of the coated surfaces. The substrate was then warmed up at 50° C. for 10 minutes to expedite removal of water molecules from the coatings. The substrate was then allowed to pass 10 times under the UV lamp in order to fully cure the coatings.

Example 9

A 1-liter, flat surface metallic pot equipped with a mechanical stirrer operating up to 20000 rpm was used. 75 g of polyol pre-polymer UV 2282 was taken in a metallic pot and mechanically stirred at 3000 rpm for 5 minutes. 0.5 g of dispersing agent BYK 348 was added to it and stirred at the same speed for 5 minutes, followed by 15 g of water and stirred for 5 minutes, then 0.5 g of antifoam agent BYK 024 was added. 2 g of photo-initiator Irgacure 500 was added and stirred for 5 minutes, followed by 2 g of ethanol and stirred for 5 minutes and 5 g of nanosilica colloidal solution or 5 g of nanoalumina colloidal solution and stirred for 5 minutes. About 50 g of the mixture was taken in a beaker and was treated with ultrasonic vibration for 10 minutes using different modes of an ultrasonic solid probe standard titanium horn with 13 mm. Finally 2 g of hardener Bayhydur® 2336 was added and stirred for 5 minutes. Generally, hardener was used just before coating and the pH of the solution was adjusted to 8 with triethylamine (TEA). The solution was coated as thin films with an abrader coater (#120) onto substrate. The coated substrate was allowed to stand for about 20 minutes in order to let water molecules evaporate out of the coated surfaces. The substrate was then warmed up at 50° C. for 10 minutes to expedite removal of water molecules from the coatings. The substrate was then allowed to pass 10 times under the UV lamp in order to fully cure the coatings.

The characteristics of the coatings made of the coating compositions according to Examples 1 to 9 are shown in the enclosed Table 1 and 2.

In comparison therewith, formulations without nanoparticles, however, otherwise similar to the formulations of Examples 1 to 9, have shown less desirable values for pendulum hardness and/or taber abrasion resistance. The results of the Comparative Examples 1 to 9 can be seen from Tables 3 and 4. Comparative results consist of examples of coatings that have no nanoparticles and to compare it with the performance of the new coatings has enhanced.

Definition of parameters tested are as follows:

Pendulum Hardness. For measuring pendulum hardness, coatings were made on glass plates (120×80 mm) and the pendulum hardness was determined with the help of a Pendulum Hardness Tester (model 707/K) of Sheen Instruments Ltd. Co., Kingston, UK in accordance with ASTM D4366. At least five different readings were recorded at different points on the coated glass plates. Each time, the pendulum oscillates in front of the electronic eye of the tester, it counts the number of passes and the hardness of the coating is dependent on the number of such oscillation counts. The number of oscillation increases with increased hardness of the coatings.

Microhardness. For measuring microhardness, coatings were made on glass plates (80×80 mm) using compact platform microhardness tester with load range from 0.01 to 30N. It is designed to provide low loads with depth measurement in microscale.

Cross-Cut Tape Tester of Precision Gage & Tool Co., Ohio, USA. The coated film was cut at 1 mm, apart and then flakes (if any) were removed by smooth brush and the film was cut again at 90° by similar distances and flakes (if any) were also removed by brush. An adhesive tape was placed on these cuts and rubbed smoothly and uniformly for better contact over the scratches and after about 90 sec, the tape was quickly pulled at 180° without jerking. This test was carried to evaluate the extent of adhesion of the coating on the surface of the substrates. The evaluation is generally classified based on the amount of coated area removed from the substrate surface by the method of cross-cut technique. This is classified from 0B to 5B. When an area of greater than 65% of the coating is removed by cross-cut, it is termed as 0B. Similarly, 1B is 35-65%, 2B is 15-35%, 3B is 5-15%, 4B is less than 5% and 5B is 0%.

Abrasion Resistance Test by Taber. The abrasion resistance test was performed according to ASTM D2228 on different coatings made on rectangular steel plates. The plates were abraded for different cycles between 1000 cycles under a load of 1 kg by using a Taber Abrader (model 5150) of Taber Industries; N.Y., USA. CS 17 wheels were used and weight loss method was used i.e. weight of the plates was recorded both before and after abrasions of different cycles.

The gloss of the coated film was measured according to ASTM D 253 using a Micro-TRI-Gloss Meter (model 89/336/EEC) of BYK-Gardner Co., Maryland, USA. The light is directed on the film coated on stainless steel surface at 60° angle.

Thermal Gravimetric Analysis (TGA). TGA analysis was carried out in a TA TGA Q500 instrument, under nitrogen at a flow rate of 100 ml/min. Samples (10-15 mg) were heated from 25° C. up to 600° C. by using a heating rate of 10° C./min. From thermogram curves, 50% wt. Loss and full degradation were determined.

Differential scanning calorimetry (DSC). DSC experiments were carried out in a TA DSC Q100 V6.2 instrument (TA Instruments, Newcastle, Del., USA). Aluminium pans containing 10-15 mg sample were heated from −70° C. to 300-400° C. under nitrogen atmosphere (gas flow: 50 ml/min). The heating rate was 5° C./min. The first heating run was carried out to remove the thermal history of the samples. From the second heating run the glass transition temperature (Tg), and the melting temperature (Tm) of the polyurethanes were obtained.

Chemical resistance. Tested by a spot test included 10% acetic acid, 10% sulfuric acid, 10% hydrochloric acid, 50% sodium hydroxide, 14% ammonium hydroxide, isopropanol, methyl ethyl ketone, DI water and gasoline.

TABLE 1

| | EX 1 | EX 2a | EX 2b | EX 3a | EX 3b | EX 4a |
|---|---|---|---|---|---|---|
| Pendulum Hardness (14 days) | 122 ± 1.2 | 144 ± 1.5 | 145 ± 1.3 | 145 ± 1.3 | 143 ± 1.7 | 150 ± 1.9 |
| Micro-hardness (N/mm$^2$) | ND | 177 | ND | ND | ND | ND |
| Cross Cut, 1 mm | 5B | 5B | 4B | 5B | 4B | 5B |
| Transparency | Clear | Cloudy | Clear | Clear | Clear | Clear |
| Taber Abrasion 1000 Cycle (wt loss, mg) | 154 ± 10.2 | 1000 ± 87 | 1200 ± 111 | 23 ± 2.2 | 26 ± 1.8 | 33 ± 4.2 |
| Gloss 60° (coated on stainless steel) | ND | 90 | 96 | 96 | 96 | 97 |
| Full Degrad. ° C. (TGA) | 520 | 520 | 540 | 525 | 520 | 520 |
| At 50% wt. loss ° C. (TGA) | 405 | 415 | 440 | 415 | 440 | 400 |
| Tm ° C. (DSC) | ND | 224.0 | 271.0 | ND | ND | 310.1 |

TABLE 1-continued

|  | EX 4b | EX 5a | EX 5b | EX 6 | EX 7 | EX 8 | EX 9 |
|---|---|---|---|---|---|---|---|
| Tg °C. (DSC) | ND | −10.6 | −30.6 | −8.0 | −8.0 | −18.8 | |
| Chemical Resistance.[a] | pass | pass | pass | pass | pass | pass | |
| Pendulum Hardness (14 days) | 143 ± 1.6 | 152 ± 1.8 | 140 ± 1.5 | 136 ± 1.0 | 144 ± 1.5 | 188.4 ± 2.6 | 182.4 ± 1.8 |
| Microhardness (N/mm$^2$) | ND | 176 | ND | ND | 132 | ND | ND |
| Cross Cut, 1 mm | 3B | 5B | 4B | 5B | 4B | 5B | 5B |
| Transparency | Clear | Clear | Clear | Clear | Cloudy | Clear | Clear |
| Taber Abrasion 1000 Cycle (wt loss, mg) | 52 ± 5.6 | 38 ± 3.3 | 47 ± 4.8 | 35 ± 3.0 | 98 ± 8.4 | 11.3 ± 1.3 | 40.2 ± 2.8 |
| Gloss 60° (coated on stainless steel) | 96 | 92 | 90 | ND | ND | 85 | 92 |
| Full Degrad. °C. (TGA) | 520 | 510 | 510 | 560 | 520 | 500 | 515 |
| At 50% wt. loss °C. (TGA) | 435 | ND | ND | 460 | 440 | 425 | 440 |
| Tm °C. (DSC) | ND | ND | ND | ND | 318 | 204 | 233 |
| Tg °C. (DSC) | −3.45 | ND | ND | ND | 1.4 | −24 | 4.0 |
| Chemical Resistance.[a] | pass | pass | pass | pass | pass | pass | pass |

[a]Tested by a spot test included 10% acetic acid, 10% sulfuric acid, 10% hydrochloric acid, 50% sodium hydroxide, 14% ammonium hydroxide, isopropanol, methyl ethyl ketone, DI water and gasoline.
ND—not determined

TABLE 2

|  | EX 8 | EX 9 |
|---|---|---|
| Pendulum Hardness (14 days) | 188.4 ± 2.6 | 182.4 ± 1.8 |
| Cross Cut, 1 mm | 5B | 5B |
| Transparency | Clear | Clear |
| Taber Abrasion 1000 Cycle (wt loss, mg) | 11.3 ± 1.3 | 40.2 ± 2.8 |
| Gloss 60° (coated on stainless steel) | 85 | 92 |
| Full Degrad. °C. (TGA) | 500 | 515 |
| At 50% wt. loss °C. (TGA) | 425 | 440 |
| Tm °C. (DSC) | 204 | 233 |
| Tg °C. (DSC) | −24 | 4.0 |
| Chemical Resistance.[a] | pass | pass |

Examples 8 and 9 represent water based polyurethane coating using UV initiator Irgacure 500, where Examples 1 through 7 are solvent based polyurethane coating.

TABLE 3

|  | EX 1 | EX 2a | EX 2b | EX 3a | EX 3b | EX 4a |
|---|---|---|---|---|---|---|
| Pendulum Hardness (14 days) | 110 ± 1.0 | 134 ± 1.3 | 133 ± 1.4 | 125 ± 1.6 | 133 ± 1.5 | 130 ± 2.3 |
| Cross Cut, 1 mm | 5B | 5B | 4B | 5B | 4B | 5B |
| Transparency | Clear | Cloudy | Cloudy | Clear | Clear | Clear |
| Taber Abrasion 1000 Cycle (wt loss, mg) | 177 ± 5.3 | 1036 ± 75.3 | 1320 ± 110.3 | 243 ± 10.2 | 165 ± 8.3 | 84 ± 5.1 |
| Gloss 60° (coated on stainless steel) | ND | 92 | 96 | 96 | 96 | 97 |
| Full Degrad. °C. (TGA) | 510 | 510 | 535 | 510 | 520 | 500 |
| At 50% wt. loss °C. (TGA) | 400 | 410 | 430 | 415 | 430 | 400 |
| Tm °C. (DSC) | ND | 229.0 | 278.8 | 235.2 | ND | 249.2 |
| Tg °C. (DSC) | ND | −21.3 | −23.1 | −11.9 | −12.4 | −27.6 |
| Chemical Resistance.[a] | pass | pass | pass | pass | pass | pass |

TABLE 3-continued

|  | EX 4b | EX 5a | EX 5b | EX 6 | EX 7 |
|---|---|---|---|---|---|
| Pendulum Hardness (14 days) | 123 ± 1.8 | 122 ± 2.8 | 126 ± 2.3 | 129 ± 1.0 | 130 ± 1.3 |
| Cross Cut 1 mm | 3B | 5B | 4B | 5B | 4B |
| Transparency | Clear | Clear | Clear | Clear | Cloudy |
| Taber Abrasion 1000 Cycle (wt loss, mg) | 75 ± 5.3 | 112 ± 11.3 | 93 ± 9.2 | 44 ± 2.1 | 122 ± 7.1 |
| Gloss 60° (coated on stainless steel) | 96 | 92 | 90 | ND | ND |
| Full Degrad. ° C. (TGA) | 515 | ND | ND | 550 | ND |
| At 50% wt. loss ° C. (TGA) | 430 | ND | ND | 460 | ND |
| Tm ° C. (DSC) | ND | ND | ND | 285 | ND |
| Tg ° C. (DSC) | ND | −14.7 | −7.6 | −3.4 | ND |
| Chemical Resistance.[a] | pass | pass | pass | pass | pass |

TABLE 4

|  | EX 8 | EX 9 |
|---|---|---|
| Pendulum Hardness (14 days) | 166.8 ± 2.2 | 159.4 ± 1.5 |
| Cross Cut | 5B | 5B |
| Transparency | Clear | Clear |
| Taber Abrasion 1000 Cycle (wt loss, mg) | 67.3 ± 3.3 | 76.2 ± 6.1 |
| Gloss 60° (coated on stainless steel) | 85 | 90 |
| Full Degrad. ° C. (TGA) | 500 | 510 |
| At 50% wt. loss ° C. (TGA) | 410 | 420 |
| Tm ° C. (DSC) | 208 | 207 |
| Tg ° C. (DSC) | −14 | −20 |
| Chemical Resistance.[a] | pass | pass |

[a]Tested by a spot test included 10% acetic acid, 10% sulfuric acid, 10% hydrochloric acid, 50% sodium hydroxide, 14% ammonium hydroxide, isopropanol, methyl ethyl ketone, DI water and gasoline.
ND—not determined This clearly shows the surprisingly improved characteristics of the coating compositions of the present invention with respect to hardness and abrasion resistance. It has also been shown experimentally that the uncured coating compositions have lower volatile organic compounds (VOC) content and lower viscosity compared with those formulations without nanoparticles.

Example 8 and 9 represent low VOC because it is water based Polyurethane coating as compared with example 1 through example 7.

The features disclosed in the foregoing description and in the claims may, both separately and in any combination thereof, be material for realizing the invention in diverse forms thereof.

What is claimed is:

1. A coating composition, comprising:
   a polyurethane polyol composition;
   a nanoparticle has a particle size in a range of 10 to 500 nm;
   a leveling agent is at least one of ethylene glycol and propylene glycol;
   a drying agent;
   a surface modifier; and
   a dispersing agent is at least at least one of Polyether modified dimethylpolysiloxane copolymer (BYK331) and solution of a copolymer with acidic groups in methoxpropylacetate/alkylbenzene (1/1) solvents BYK110.

2. The coating composition according to claim 1, wherein the polyurethrane polyol composition is a reaction product of a polyisocyanate and a polyol.

3. The coating composition according to claim 1, wherein the nanoparticle has a particle size in a range of 20 to 200 nm 4. The coating composition according to claim 3, wherein the nanoparticle is at least one of a silica and an alumina.

5. The coating composition according to claim 2, wherein the polyol is at least one of a α,β-diols, a α,γ-diols, and a mixtures thereof.

6. The coating composition according to claim 2, wherein the polyisocyanate is at least one of a 1,6-hexamethylene diisocyanate, a aliphatic polyisocyanate, a isophorone diisocyanate,a tetramethylxylene diisocyanate, a 2-methyl-1,5-pentane diisocyanate, a 2,2,4-trimethyl-1,6-hexamethylene diisocyanate, a 1,12-dodecane diisocyanate, a methylene bis (4-cyclohexylisocyanate), a biuret of a 1,6-hexamethylene diisocyanate, a isocyanurate of a 1,6-hexamethylene diisocyanate, a isocyanurate of a isophorone diisocyanate, and a triisocyanate functional adduct of a tetramethylxylene diisocyanate and a trimethyl propane.

7. The coating composition according to claim 1, wherein the surface modifier is at least one of methacryloxy-propyl-trimethoxy-silane (MEMO), vinyl-trimethoxy-silane (VTMO), isobutyl-trimethoxy-silane (IBTMO) and 3-glycidoxy-propyl-trimethoxy-silane (GLYMO).

8. The coating composition according to claim 1, wherein the drying agent is at least one of a methyl ethyl ketone, a methyl isobutyl ketone and a xylene.

9. A method, comprising:
   mixing a surface modifier with a methanol-HCl solution;
   admixing a nanoparticle, the methanol-HCl solution and a water in a ratio of 3:2:3:2 (w/w);
   mechanically mixing the above mixture at 240 rpm;
   condensing the above mixture by refluxing in a round bottom flask;
   circulating a water through the condenser at about 18° C.;
   obtaining a white slurry after 45 minutes from the condensor;
   removing the excess water from the white slurry;
   mixing the white slurry with a polyurethane polyol composition, a dispersing agent, a leveling agent and a drying agent to make a coating composition.

10. The method according to claim 9, further comprising:
    dispersing the coating composition through a ultrasonic dispersion, wherein the ultrasonic dispersion is at least one of a continuous and a pulse ultrasonic dispersion technique.

11. The method according to claim 9, wherein the polyurethrane polyol composition is a reaction product of a polyisocyanate and a polyol.

12. The method according to claim 9, wherein the nanoparticle has a particle size in a range of 20 to 200 nm 13. The method according to claim 9, wherein the nanoparticle is at least one of a silica and an alumina.

14. The method according to claim 9, wherein the polyol is at least one of a α,β-diols, a α,γ-diols, and a mixtures thereof.

15. The method according to claim 9, wherein the polyisocyanate is at least one of a 1,6-hexamethylene diisocyanate, a aliphatic polyisocyanate, a isophorone diisocyanate, a tetramethylxylene diisocyanate, a 2-methyl-1,5-pentane diisocyanate, a 2,2,4-trimethyl-1,6-hexamethylene diisocyanate, a 1,12-dodecane diisocyanate, a methylene bis(4-cyclohexyl-isocyanate), a biuret of a 1,6-hexamethylene diisocyanate, a isocyanurate of a 1,6-hexamethylene diisocyanate, a isocyanurate of a isophorone diisocyanate, and a triisocyanate functional adduct of a tetramethylxylene diisocyanate and a trimethyl propane.

16. The method according to claim 9, wherein the dispersing agent is at least one of Polyether modified dimethylpolysiloxane copolymer (BYK331) and solution of a copolymer with acidic groups in methoxpropylacetate/alkylbenzene (1/1) solvents BYK110.

17. The method according to claim 9, wherein the leveling agent are at least one of ethylene glycol and propylene glycol.

18. The method according to claim 9, wherein the surface modifier is at least one of methacryloxy-propyl-trimethoxy-silane (MEMO), vinyl-trimethoxy-silane (VTMO), isobutyl-trimethoxy-silane (IBTMO) and 3-glycidoxy-propyl-tri-methoxy-silane (GLYMO).

19. The method according to claim 9, wherein the drying agent is at least one of a methyl ethyl ketone, a methyl isobutyl ketone and a xylene.

* * * * *